US010254914B2

(12) United States Patent
Andersen et al.

(10) Patent No.: US 10,254,914 B2
(45) Date of Patent: *Apr. 9, 2019

(54) CONFIGURING THREE DIMENSIONAL DATASET FOR MANAGEMENT BY GRAPHICAL USER INTERFACE

(71) Applicant: International Business Machines Corporation, Armonk, NY (US)

(72) Inventors: John J. Andersen, Austin, TX (US); Jacob A. Daigle, Austin, TX (US); Jason E. Doucette, Saskatoon (CA); Wilson L. Wu, Arcadia, CA (US)

(73) Assignee: International Business Machines Corporation, Armonk, NY (US)

( * ) Notice: Subject to any disclaimer, the term of this patent is extended or adjusted under 35 U.S.C. 154(b) by 193 days.

This patent is subject to a terminal disclaimer.

(21) Appl. No.: 15/250,773

(22) Filed: Aug. 29, 2016

(65) Prior Publication Data

US 2018/0059900 A1  Mar. 1, 2018

(51) Int. Cl.
*G06F 3/0481* (2013.01)
*G06F 3/0484* (2013.01)
*G06F 3/0488* (2013.01)

(52) U.S. Cl.
CPC ...... *G06F 3/04815* (2013.01); *G06F 3/04845* (2013.01); *G06F 3/04883* (2013.01); *G06F 2203/04802* (2013.01); *G06F 2203/04806* (2013.01)

(58) Field of Classification Search
CPC ................................ G06T 19/003; G06F 8/34
USPC .................................. 715/850, 763, 851, 853
See application file for complete search history.

(56) References Cited

U.S. PATENT DOCUMENTS

| 8,325,187 | B2* | 12/2012 | Shenhav | G06F 3/04815 |
| | | | | 345/427 |
| 9,070,210 | B1* | 6/2015 | Overbeck | G06T 19/20 |
| 9,483,873 | B2* | 11/2016 | Pennington | G06T 19/20 |
| 2012/0167143 | A1 | 6/2012 | Longet | |

(Continued)

FOREIGN PATENT DOCUMENTS

WO    2010108499    9/2010

OTHER PUBLICATIONS

Cohe et al., "Understanding User Gestures for Manipulating 3D Objects from Touchscreen Inputs", Graphics Interface Conference 2012, Toronto, Ontario, Canada, May 2012, 8 pages.

(Continued)

*Primary Examiner* — Cao H Nguyen
(74) *Attorney, Agent, or Firm* — Vanheeuwen & VanLeeuwen; Feb R. Cabrasawan (57) ABSTRACT

An approach is provided that selects three attributes that correspond to objects included in a dataset, where each of the three attributes is assigned to a different coordinate value (x, y, and z coordinates). The approach creates a simulated three dimensional (3D) scene of the objects on a display screen by using the x, y, and z coordinate values corresponding to the attributes of each of the objects. The approach further displays, on a 2D screen, a gyroscopic graphical user interface (GUI) that provides three dimensional (3D) control of the simulated 3D scene. In the approach, a gesture from a user receiving at the gyroscopic GUI. Responsively, the approach adjusts the 3D scene displayed on the 2D screen based on the gesture that was received.

15 Claims, 7 Drawing Sheets

(56) References Cited

U.S. PATENT DOCUMENTS

| | | |
|---|---|---|
| 2012/0223936 A1 | 9/2012 | Aughey et al. |
| 2013/0159935 A1* | 6/2013 | Evans ................. G06F 3/04815 |
| | | 715/850 |
| 2013/0162534 A1 | 6/2013 | Chen |
| 2013/0223673 A1 | 8/2013 | Davis |
| 2014/0359536 A1 | 12/2014 | Cheng |
| 2015/0100906 A1 | 4/2015 | Lev |
| 2015/0269785 A1 | 9/2015 | Bell et al. |
| 2015/0370322 A1 | 12/2015 | Gustafson |
| 2016/0105475 A1* | 4/2016 | Goodman ............. G06F 3/0487 |
| | | 715/753 |

OTHER PUBLICATIONS

Henriksen et al., "Virtual Trackballs Revisited," Jun. 30, 2012, Department of Computer Science, University of Copenhagen, Denmark, 15 pages.

Andersen et al., "Graphical User Interface for Managing Three Dimensional Dataset," U.S. Appl. 15/250,741, filed Aug. 29, 2016, 34 pages.

"List of IBM Patents or Patent Applications Treated as Related," Letter from Leslie A. Van Leeuwen, Aug. 29, 2016, 1 page.

* cited by examiner

CONFIGURING THREE DIMENSIONAL DATASET FOR MANAGEMENT BY GRAPHICAL USER INTERFACE

BACKGROUND OF THE INVENTION

Technical Field

This disclosure relates to configuring a dataset with three dimensions so that it can be managed by a graphical user interface (GUI).

Description of Related Art

Current touch interfaces primarily function in the two dimensional space allowing the user to operate and manipulate objects in two degrees of motion on the X and Y axis. Though this functionally is simple and intuitive, it limits the user's experience to a planar surface. Therefore, the user can only interact with gestures in a planar nature which often lack depth and perspective.

SUMMARY

An approach is provided for a three dimensional touch interface system capable of providing depth and perspective not typically achievable in a two dimensional space. This approach provides a gyroscopic GUI control interface that provides a natural and logical feel in controlling, orienting and manipulating in the X, Y and Z axis of a three dimensional space. The form of interaction provided by this gyroscopic tool gives the user a tool for teaching touch interactions as well as gestural interfaces within a three dimensional application and allow a smoother and more intuitive interaction allowing for a quicker work flow. This approach is a software-based approach that projects a virtual gyroscope that allows the user to interact with the 3D environment and the objects therein.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

FIGS. 1-7 describe an approach using a three dimensional touch interface system capable of providing depth and perspective not typically achievable in a two dimensional space. This approach provides a gyroscopic GUI control interface that provides a natural and logical feel in controlling, orienting and manipulating in the X, Y and Z axis of a three dimensional space. The form of interaction provided by this gyroscopic tool gives the user a tool for teaching touch interactions as well as gestural interfaces within a three dimensional application and allow a smoother and more intuitive interaction allowing for a quicker work flow. This approach is a software-based approach that projects a virtual gyroscope that allows the user to interact with the 3D environment and the objects therein.

The core idea of this approach is to create a method to interact with a three dimensional experience on a touch screen, with two dimensional inputs. This is accomplished by the implementation of the gyroscopic GUI control interface. The advantages of this system over traditional systems is that the gyroscopic control scheme is provided within the experience itself, and not an extra external peripheral that is required to be installed. The gyroscopic control is provided on screen and allows the user to control an organic formation in a three dimensional space by using lateral interactions on a touch screen.

This approach works by overlaying a virtual gyroscope GUI control on the screen that allows the user to manipulate the three dimensional space as well as potential objects in the space. This is done by manipulating the gyroscope in any of the three axes, these being the X, Y and Z axes. In addition, the user can also perform pinch gestures within the gyroscope to zoom in and out in the virtual environment or the object itself. Finally, the user can also pan the gyroscope in any particular direction to move the environment or object in the environment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
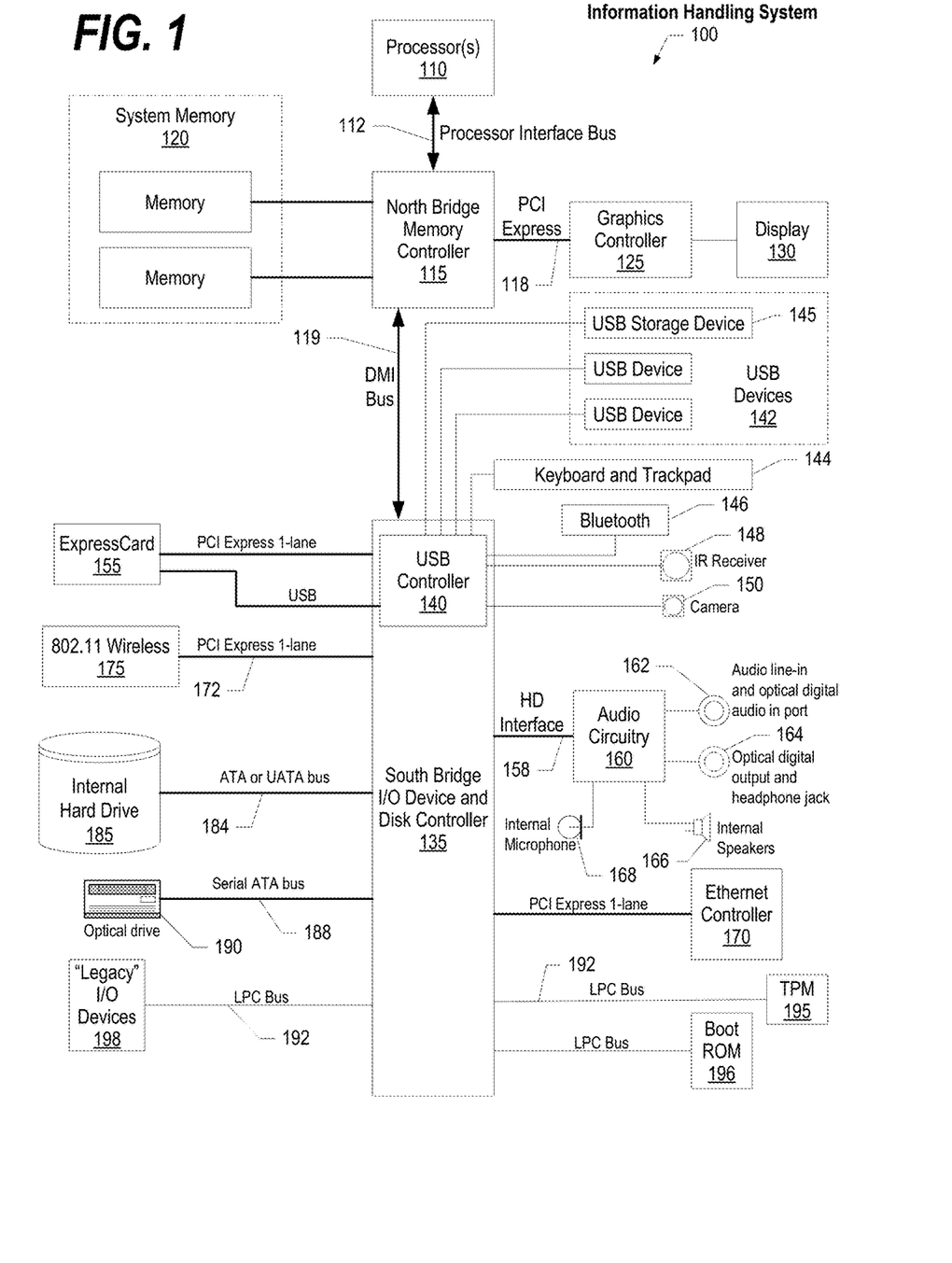
FIG. 1 depicts a block diagram of a processor and components of an information handling system.
Figure 2:
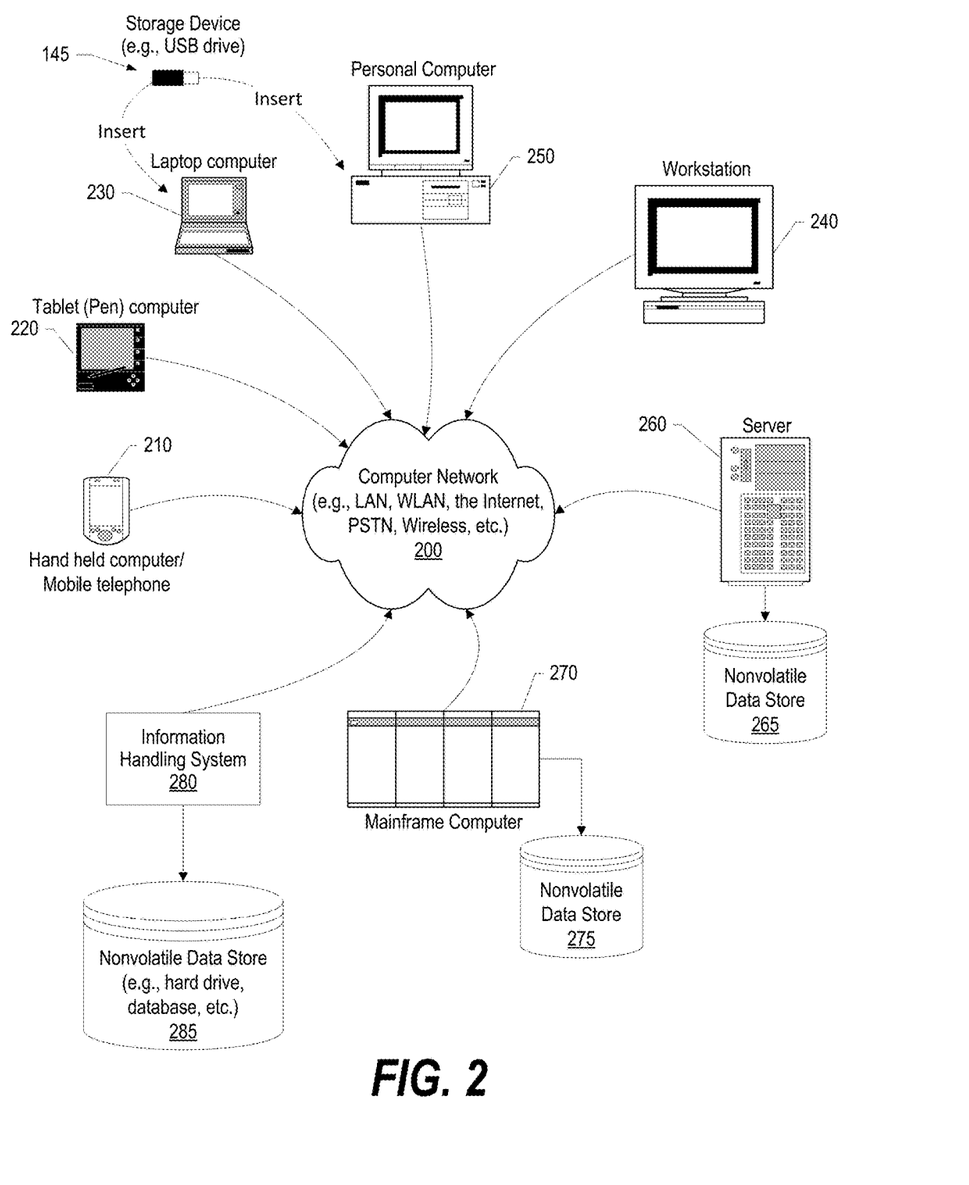
FIG. 2 is a network environment that includes various types of information handling systems interconnected via a computer network.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, et cetera.

Wireless Local Area Network (LAN) device 175 connects to Southbridge 135 via the PCI or PCI Express bus 172. LAN device 175 typically implements one of the IEEE .802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
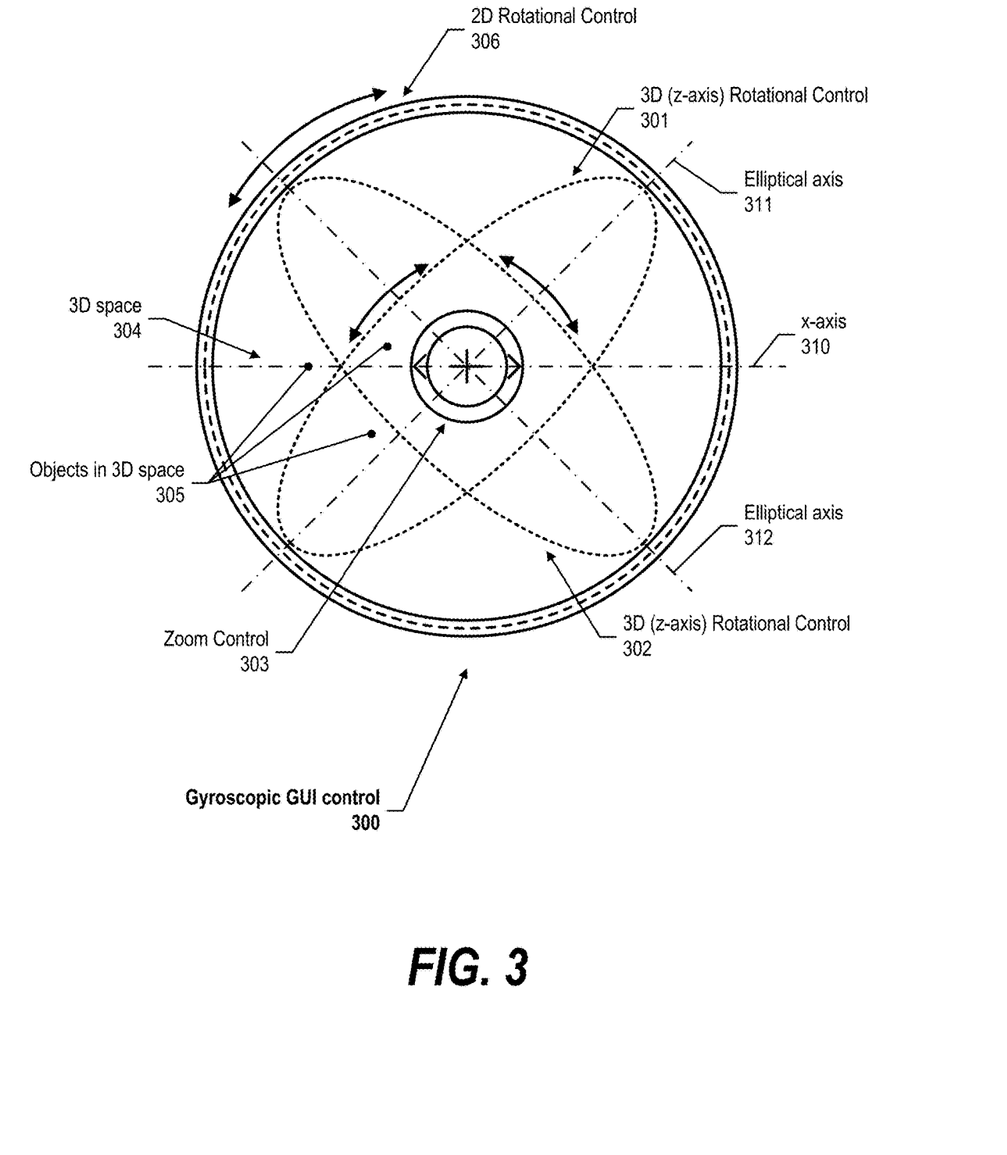
FIG. 3 is a depiction of a three dimensional graphical user interface (GUI) that provides controls to manipulate data in three dimensions.

FIG. 3 is a depiction of a three dimensional graphical user interface (GUI) that provides controls to manipulate data in three dimensions. Gyroscopic GUI control 300 allows a user to manipulate, or adjust, a three dimensional (3D) scene, depicted as 3D space 304, that includes one or more objects 305. Gyroscopic GUI control 300 includes two dimensional (2D) rotational control 306 that allows the user to rotate 3D space 304 either clockwise or counter-clockwise so that objects 305 appear with altered x and y coordinates but keep the same z coordinates. Gyroscopic GUI control 300 also includes one or more 3D rotational controls 301 and 302 that allow the user to rotate 3D space 304 around the center of the ellipse that forms the 3D rotational control in a manner that alters the x, y, and z coordinates of objects 305 appearing in 3D space 304. The 3D rotational controls 301 and 302 include an angle with respect to x-axis 310, the angle being the angle between x-axis 310 and elliptical axes 311 and 312, respectively, with the elliptical axes being the major axis of the respective ellipses that form 3D rotational control 301 and 302. The adjustment made to the coordinates being based on the angle formed by these two axes and the size of the minor axis of the 3D rotational control. The size of the minor axis in relation to the major axis of the 3D rotational control is adjustable by the user as is the angle between elliptical axes 311 and 312 and x-axis 310. A smaller angle results in a larger adjustment in the x-coordinate with respect to the y-coordinate and, likewise, a larger angle results in a smaller adjustment in the x-coordinate with respect to the y-coordinate. The relative size of the minor axis of the ellipse with respect to the major axis changes the size of the adjustment of the z-coordinate with a smaller minor axis resulting in a smaller adjustment of the z-coordinate values and a larger minor axis resulting in a larger adjustment of the z-coordinate values.

Zoom control 303 is used to zoom the 3D scene, depicted as 3D space 304, in or out. For example, a "pinch" gesture could be utilized to zoom in on 3D space 304 and an "expand" gesture could be utilized to zoom out on 3D space 304. A 2D rotational gesture, such as a user touching 2D rotational control 306 on a touch screen display and moving the user's finger clockwise or counter-clockwise along control 306 is used to rotate objects 305 displayed in 3D scene 304 without adjusting the objects' z-coordinates. A 3D control gesture, such as the user touching 3D rotational control 301 on the touch screen display and moving the user's finger clockwise or counter-clockwise along control 301 is used to rotate objects 305 displayed in 3D scene 304 in simulated 3D space, adjusting the objects x, y, and z coordinates based on the angle of controls 301 and 302 and the minor axis of each of these controls, as described above. A 3D control modification gesture to modify the angle of 3D rotational control could be using a two-finger gesture applied to 3D rotational control 301 or 302 with the two fingers being close to each other on the control (e.g., using the index and middle fingers of the same hand, etc.), while a 3D control modification gesture to modify the minor axis size of 3D rotational control could be a two-finger gesture applied to opposites sides of the 3D control somewhat along the minor axis of the control using a "pinch" or "expand" gesture of the two fingers (e.g., pinching the fingers towards each other to reduce the size of the minor axis and expanding the fingers away from each other to increase the size of the minor axis, etc.).

Figure 4:
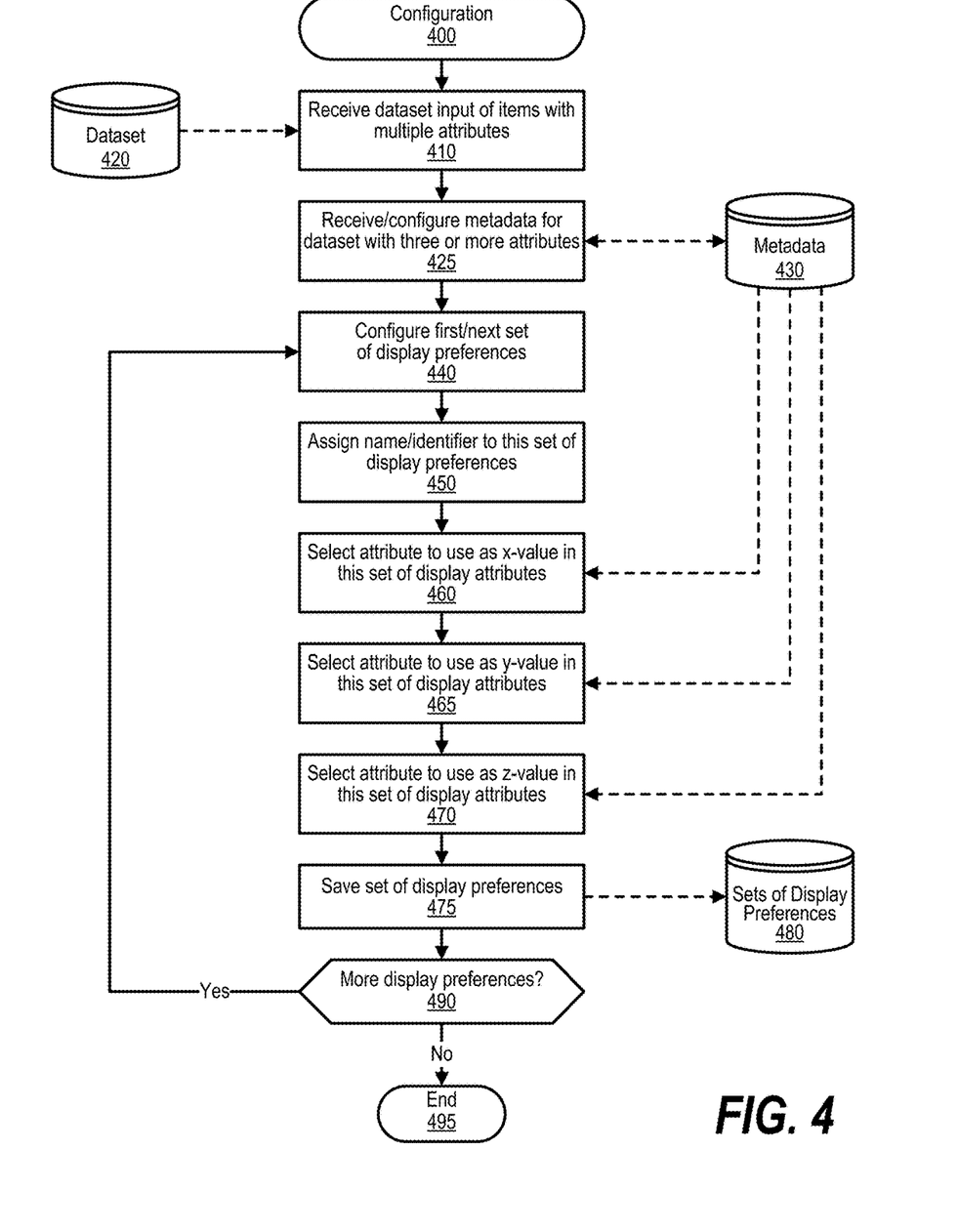
FIG. 4 is a depiction of a flowchart showing steps taken during a configuration routine that configures a dataset for three dimensional viewing by a graphical user interface.

FIG. 4 is a depiction of a flowchart showing steps taken during a configuration routine that configures a dataset for three dimensional viewing by a graphical user interface. FIG. 4 processing commences at 400 and shows the steps taken by a configuration process. At step 410, the process receives dataset input of items with multiple attributes. Step 410 retrieves the data from dataset data store 420. At step 425, the process receives and configures metadata for the dataset with three or more attributes. Step 425 stores the metadata in data store 430.

At step 440, the process configures the first set of display preferences. At step 450, the process assigns a name and/or an identifier to this set of display preferences. The name and identifier can be specified by the user performing the configuration or can automatically be provided by the process. At step 460, the user selects the attribute that the user wishes to use as the x-value in this set of display attributes. At step 465, the user selects the attribute that the user wishes to use as the y-value in this set of display attributes. At step 470, the user selects the attribute that the user wishes to use as the z-value in this set of display attributes. At step 475, the process saves set of display preferences, those being the name/identifier, and the attributes that are to be used for the x, y, and z coordinates when the dataset is displayed by the gyroscopic GUI control. Step 475 stores the display preferences in data store 480.

The process determines as to whether the user wishes to configure more display preferences (decision 490). If the user wishes to configure more display preferences, then decision 490 branches to the 'yes' branch which loops back to step 440 to receive the next set of display preferences. This looping continues until the user does not wish to configure additional display preferences, at which point decision 490 branches to the 'no' branch exiting the loop. FIG. 4 processing thereafter ends at 495.

Figure 5:
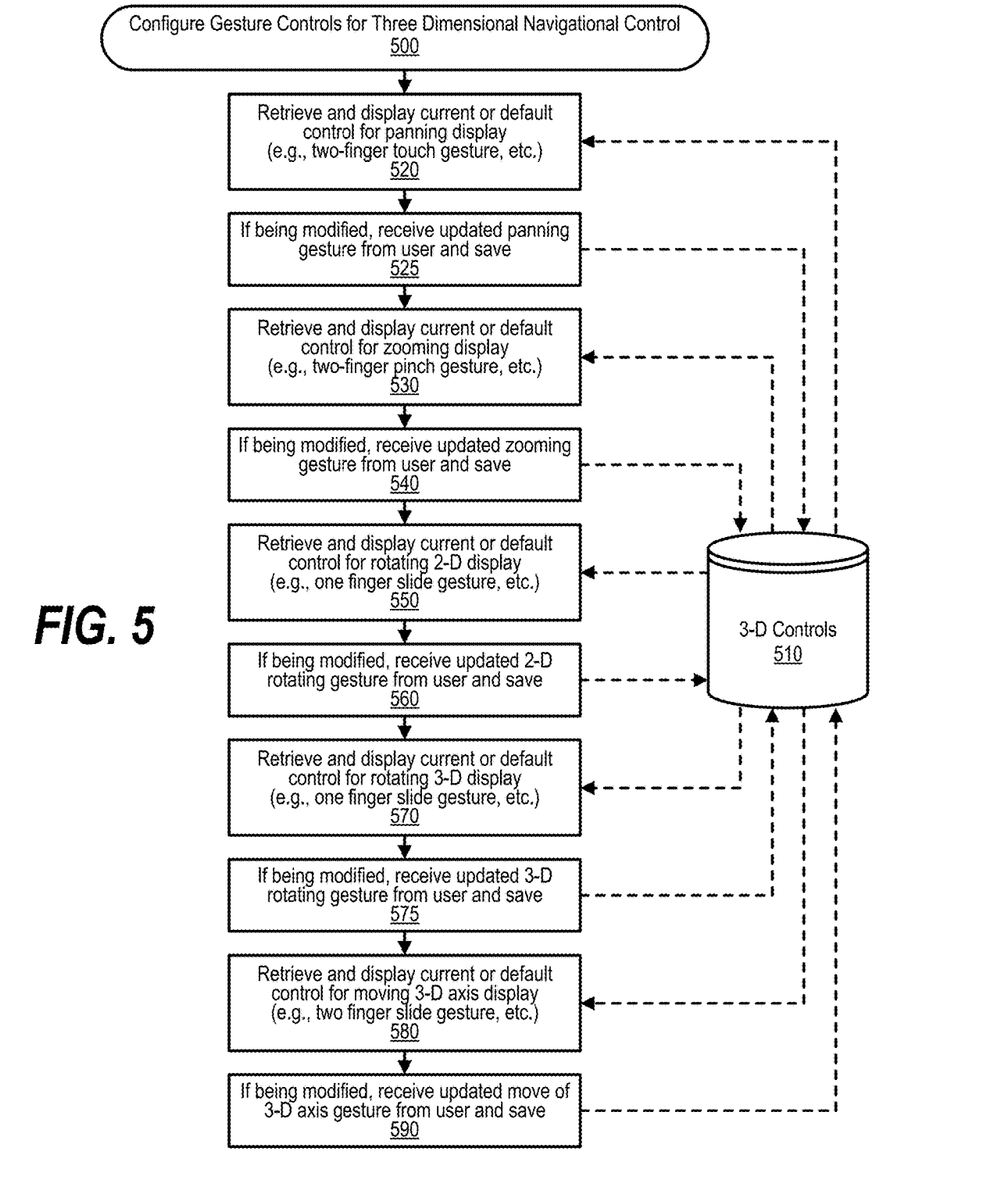
FIG. 5 is a depiction of a flowchart showing steps taken during a process that configures gesture controls used to manage the three dimensional viewing using the graphical user interface.

FIG. 5 is a depiction of a flowchart showing steps taken during a process that configures gesture controls used to manage the three dimensional viewing using the graphical user interface. FIG. 5 processing commences at 500 and shows the steps taken by a process that configures gesture controls for three dimensional navigational control when using the gyroscopic GUI control. At step 520, the process retrieves and display the current or default gesture for panning the display (e.g., two-finger touch gesture, etc.). Step 520 retrieves the current or default gesture for panning the display from data store 510. If the panning gesture is being modified, then, at step 525, the process receives the updated panning gesture from the user and saves the updated gesture in data store 510.

At step 530, the process retrieves and display the current or default gesture for zooming the display (e.g., two-finger pinch gesture, etc.). Step 530 retrieves the current or default gesture for zooming the display from data store 510. If the zooming gesture is being modified, then, at step 540, the process receives the updated zooming gesture from the user and saves the updated gesture in data store 510.

At step 550, the process retrieves and display the current or default gesture for rotating the 2D display (e.g., one finger slide gesture, etc.). Step 550 retrieves the current or default gesture for rotating the 2D display from data store 510. If the gesture for rotating the 2D display gesture is being modified, then, at step 560, the process receives the updated gesture for rotating the 2D display gesture from the user and saves the updated gesture in data store 510.

At step 570, the process retrieves and display the current or default gesture for rotating the 3D display (e.g., one finger slide gesture, etc.). Step 570 retrieves the current or default gesture for rotating the 3D display from data store 510. If the gesture for rotating the 3D display gesture is being modified, then, at step 575, the process receives the updated gesture for rotating the 3D display gesture from the user and saves the updated gesture in data store 510. At step 580, the process retrieves and display the current or default gesture for moving the 3D axis display (e.g., two finger slide gesture, etc.).

Step 580 retrieves the current or default gesture for moving the 3D axis display from data store 510. If the gesture for moving the 3D axis display gesture is being modified, then, at step 590, the process receives the updated gesture for rotating the 3D display gesture from the user and saves the updated gesture in data store 510.

Figure 6:
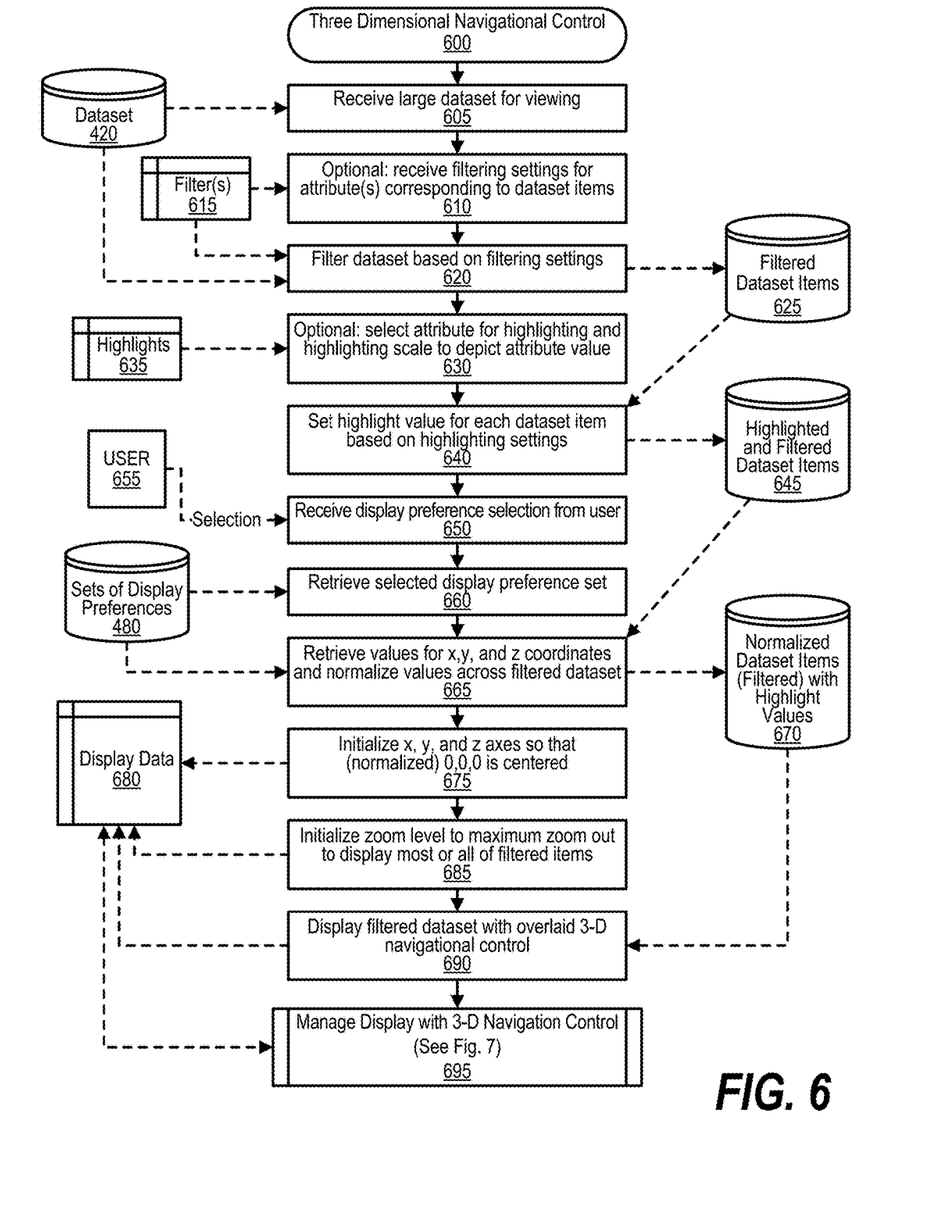
FIG. 6 is a depiction of a flowchart showing the steps taken to provide three dimensional navigational control using the graphical user interface.

FIG. 6 is a depiction of a flowchart showing the steps taken to provide three dimensional navigational control using the graphical user interface. FIG. 6 processing commences at 600 and shows the steps taken by a process that builds a three dimensional navigational gyroscopic GUI control. At step 605, the process receives a large dataset (dataset 420) for viewing by the gyroscopic GUI control. At step 610, the process receives optional filtering settings for attributes corresponding to dataset items from memory area 615. For example, a filter might be applied to eliminate objects with small values for one or more attribute settings.

At step 620, the process filters dataset 420 based on the filtering settings received at step 610. The filtered database objects are stored in data store 625. At step 630, the process selects optional highlight attributes for highlighting and highlighting scale to depict attribute value from memory area 635. For example, objects with an attribute value within a particular range might be colored yellow to highlight such objects to the user. The attributes used to highlight might not be attributes that correspond to any of the x, y, or z coordinates used to display the object with such x, y, and z coordinates corresponding to different attributes of the object.

At step 640, the process sets the highlight value the objects that are to be displayed in the 3D space based on the received highlighting settings. Objects that have been filtered and highlighted are stored in data store 645. At step 650, the process receives a display preference selection from user 655. As previously described in FIG. 4, the user can configure different display preferences for a dataset with each set of display preferences having a name or identifier and each specifying what attributes of the objects are assigned to the respective x, y, and z coordinate settings when displayed by the gyroscopic GUI control.

At step 660, the process retrieves the selected display preference set from data store 480. At step 665, the process retrieves the values for x, y, and z coordinates according to the selected preference set and, in one embodiment, the process further normalizes the values across filtered the dataset. The retrieved, and possibly normalized, values are stored in data store 670. In one embodiment, the normalizing includes setting a scale value for each of the x, y, and z axes according to the spread of corresponding attribute values. At step 675, the process initializes the x, y, and z axes so that (normalized) 0,0,0 is centered on the gyroscopic GUI control. The initialized display data is stored in memory area 680 that is managed by the gyroscopic GUI control to display the attributes of data store 420 in a simulated three dimensional space.

At step 685, the process initializes the zoom level and stores the resulting values in memory area 680. In one embodiment, the zoom level is initialized to a maximum zoom out level in order to display most or all of filtered items on the gyroscopic GUI control. At step 690, the process displays the filtered dataset with the overlaid gyroscopic GUI navigational control. Step 690 retrieves the object data to display from data store 670 and stores the display data in memory area 680. At predefined process 695, the process performs the Manage Display with 3D Navigation Control routine (see FIG. 7 and corresponding text for processing details).

Figure 7:
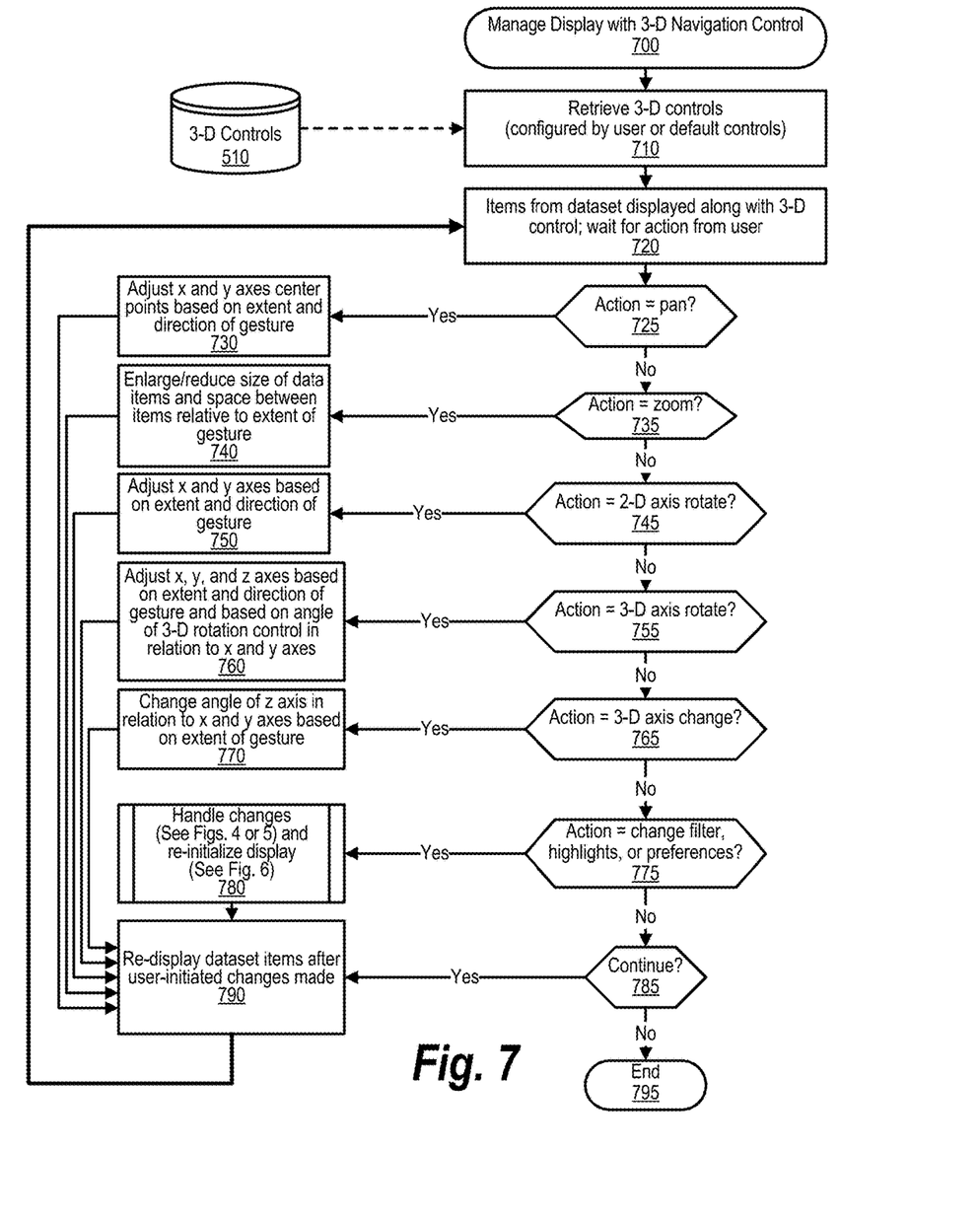
FIG. 7 is a depiction of a flowchart showing the steps taken to manage the display of the dataset using the three dimensional navigational GUI control.

FIG. 7 is a depiction of a flowchart showing the steps taken to manage the display of the dataset. FIG. 7 processing commences at 700 and shows the steps taken by a process that manages the display using the gyroscopic GUI control. At step 710, the process retrieves 3D controls from data store 510. FIG. 5 and corresponding text described the configuration of gestures by the user and the use of default gestures for controls found on the gyroscopic GUI control.

At step 720, the process displays objects the dataset along with the gyroscopic GUI control and waits to receive an action at the GUI control from the user. Processing continues when an action is received.

The process determines as to whether the action performed by the user is a pan gesture (decision 725). If the action performed by the user is a pan gesture, then decision 725 branches to the 'yes' branch, whereupon, at step 730, the process adjusts the x and y axes center points based on the extent and direction of the pan gesture. Processing then branches to step 790 before looping back to step 720 to receive the next action from the user. Returning to decision 725, if the action performed by the user is not a pan gesture, then decision 725 branches to the 'no' branch and processing continues to analyze the action received from the user.

The process next determines as to whether the action performed by the user is a zoom gesture (decision 735). If the action performed by the user is a zoom gesture, then decision 735 branches to the 'yes' branch whereupon, at step 740, the process enlarges or reduces the size of the objects displayed in the gyroscopic GUI control and the space between objects relative to extent of the zoom gesture. Processing then branches to step 790 before looping back to step 720 to receive the next action from the user. Returning to decision 735, if the action performed by the user is a not zoom gesture, then decision 735 branches to the 'no' branch and processing continues to analyze the action received from the user.

The process determines as to whether the action performed by the user is a 2D axis rotate gesture (decision 745). If the action performed by the user is a 2D axis rotate gesture, then decision 745 branches to the 'yes' branch whereupon, at step 750, the process adjusts x and y axes based on extent and direction of gesture with the display resulting in the objects appearing to rotate around the center of the gyroscopic GUI control. Processing then branches to step 790 before looping back to step 720 to receive the next action from the user. Returning to decision 745, if the action performed by the user is a 2D axis rotate gesture, then decision 745 branches to the 'no' branch and processing continues to analyze the action received from the user.

The process determines as to whether the action performed by the user is a 3D axis rotate gesture (decision 755). If action=3D axis rotate, then decision 755 branches to the 'yes' branch whereupon, at step 760, the process adjusts x, y, and z axes based on extent and direction of gesture and based on angle of 3D rotation control in relation to x and y axes. In one embodiment, the adjustment of the axes is further based on the size of the minor axis of the 3D rotation control with respect to the size of the major axis of the 3D control. On the other hand, if not action=3D axis rotate, then decision 755 branches to the 'no' branch and processing continues to analyze the action received from the user.

The process determines as to whether the action performed by the user is a 3D axis change gesture (decision 765). If the action performed by the user is a 3D axis change gesture, then decision 765 branches to the 'yes' branch whereupon, at step 770, the process changes the angle of z axis in relation to x and y axes based on extent of gesture. In one embodiment, the user can also change the size of the 3D rotation control's minor axis to make the axis larger or smaller with comparison to the control's major axis. Processing then branches to step 790 before looping back to step 720 to receive the next action from the user. Returning to decision 765, if the action performed by the user is not a 3D axis change gesture, then decision 765 branches to the 'no' branch and processing continues to analyze the action received from the user.

The process next determines as to whether the action performed by the user is a request to change filters, highlights, or preferences (decision 775). If the action performed by the user is a request to change filters, highlights, or preferences, then decision 775 branches to the 'yes' branch to perform predefined process 780. Processing then performs step 790 before looping back to step 720 to receive the next action from the user. Returning to decision 775 if the action performed by the user is not a request to change filters, highlights, or preferences, then decision 775 branches to the 'no' branch. At predefined process 780, the process performs one or more routines shown in FIGS. 4 and 5 based on the action requested by the user and the process further re-initializes the display based on the changes made by the user (see FIG. 6 and corresponding text for processing details for initializing the display with the gyroscopic GUI control).

The process determines as to whether the user wishes to continue using the gyroscopic GUI control (decision 785). If the user wishes to continue using the gyroscopic GUI control, then decision 785 branches to the 'yes' branch to perform step 790 which re-displays objects after the user initiated changes have been made. On the other hand, if the user is finished using the gyroscopic GUI control, then decision 785 branches to the 'no' branch and processing thereafter ends at 795.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:
   selecting a first attribute, a second attribute, and a third attribute, wherein each of the attributes correspond to a plurality of objects included in a dataset;
   assigning the first attribute to an x coordinate value, the second attribute to a y coordinate value, and the third attribute to a z coordinate value;
   creating a simulated three dimensional (3D) scene of the plurality of objects on a display screen by using the x, y, and z coordinate values corresponding to the attributes of each of the plurality of objects;
   displaying, on a two dimensional (2D) screen, a gyroscopic graphical user interface (GUI) that provides three dimensional (3D) control of the simulated 3D scene, wherein the gyroscopic GUI comprises a 2D rotational control and one or more 3D rotational controls that are each separately responsive to interactions performed by a user, and wherein a selected 3D rotational control is an elliptical-shaped control centered in the gyroscopic GUI and an angle with respect to an x-axis of the gyroscopic GUI control;
   receiving, at the selected 3D rotational control, a 3D rotational gesture from the user; and
   adjusting the 3D scene displayed on the 2D screen in response to the received gesture, wherein the adjusting comprises altering an x, a y, and a z coordinates of at least one of the plurality of objects included in the 3D scene based on the angle and an extent of the 3D rotational gesture.

2. The method of claim 1 further comprising:
   displaying the plurality of objects with the altered x, y, and z coordinates in the 3D scene.

3. The method of claim 2 wherein the altering comprises altering the x, the y, and the z coordinates of the plurality of objects based on the angle and an extent of the 3D rotational gesture.

4. The method of claim 3 wherein the altering of the x, y, and z coordinates is further based on a minor elliptical axis size of the selected 3D rotational control with respect to a major elliptical axis size of the selected 3D rotational control.

5. The method of claim 1 further comprising:
   configuring a plurality of display preferences, wherein each of the display preferences assigns a set of coordinate values that include the x coordinate value, the y coordinate value, and the z coordinate value to a different set of attributes selected from a plurality of attributes that correspond to the plurality of objects, wherein the first, second, and third attributes are included in the plurality of attributes.

6. An information handling system comprising:
   one or more processors;
   a memory coupled to at least one of the processors; and
   a set of computer program instructions stored in the memory and executed by at least one of the processors in order to perform actions comprising:
      selecting a first attribute, a second attribute, and a third attribute, wherein each of the attributes correspond to a plurality of objects included in a dataset;
      assigning the first attribute to an x coordinate value, the second attribute to a y coordinate value, and the third attribute to a z coordinate value;
      creating a simulated three dimensional (3D) scene of the plurality of objects on a display screen by using the x, y, and z coordinate values corresponding to the attributes of each of the plurality of objects;
      displaying, on a two dimensional (2D) screen, a gyroscopic graphical user interface (GUI) that provides three dimensional (3D) control of the simulated 3D scene, wherein the gyroscopic GUI comprises a 2D rotational control and one or more 3D rotational controls that are each separately responsive to interactions performed by a user, and wherein a selected 3D rotational control is an elliptical-shaped control centered in the gyroscopic GUI and an angle with respect to an x-axis of the gyroscopic GUI control;
      receiving, at the selected 3D rotational control, a 3D rotational gesture from the user; and adjusting the 3D scene displayed on the 2D screen in response to the received gesture, wherein the adjusting comprises altering an x, a y, and a z coordinates of at least one of the plurality of objects included in the 3D scene based on the angle and an extent of the 3D rotational gesture.

7. The information handling system of claim 6 wherein the actions further comprise:
displaying the plurality of objects with the altered x, y, and z coordinates in the 3D scene.

8. The information handling system of claim 7 wherein the altering comprises altering the x, the y, and the z coordinates of the plurality of objects based on the angle and an extent of the 3D rotational gesture.

9. The information handling system of claim 8 wherein the altering of the x, y, and z coordinates is further based on a minor elliptical axis size of the selected 3D rotational control with respect to a major elliptical axis size of the selected 3D rotational control.

10. The information handling system of claim 6 wherein the actions further comprise:
configuring a plurality of display preferences, wherein each of the display preferences assigns a set of coordinate values that include the x coordinate value, the y coordinate value, and the z coordinate value to a different set of attributes selected from a plurality of attributes that correspond to the plurality of objects, wherein the first, second, and third attributes are included in the plurality of attributes.

11. A computer program product stored in a computer readable storage medium, comprising computer program code that, when executed by an information handling system, performs actions comprising:
selecting a first attribute, a second attribute, and a third attribute, wherein each of the attributes correspond to a plurality of objects included in a dataset;
assigning the first attribute to an x coordinate value, the second attribute to a y coordinate value, and the third attribute to a z coordinate value;
creating a simulated three dimensional (3D) scene of the plurality of objects on a display screen by using the x, y, and z coordinate values corresponding to the attributes of each of the plurality of objects;
displaying, on a two dimensional (2D) screen, a gyroscopic graphical user interface (GUI) that provides three dimensional (3D) control of the simulated 3D scene, wherein the gyroscopic GUI comprises a 2D rotational control and one or more 3D rotational controls that are each separately responsive to interactions performed by a user, and wherein a selected 3D rotational control is an elliptical-shaped control centered in the gyroscopic GUI and an angle with respect to an x-axis of the gyroscopic GUI control;
receiving, at the selected 3D rotational control, a 3D rotational gesture from the user; and
adjusting the 3D scene displayed on the 2D screen in response to the received gesture, wherein the adjusting comprises altering an x, a y, and a z coordinates of at least one of the plurality of objects included in the 3D scene based on the angle and an extent of the 3D rotational gesture.

12. The computer program product of claim 11 wherein the actions further comprise:
displaying the plurality of objects with the altered x, y, and z coordinates in the 3D scene.

13. The computer program product of claim 12 wherein the altering comprises altering the x, the y, and the z coordinates of the plurality of objects based on the angle and an extent of the 3D rotational gesture.

14. The computer program product of claim 13 wherein the altering of the x, y, and z coordinates is further based on a minor elliptical axis size of the selected 3D rotational control with respect to a major elliptical axis size of the selected 3D rotational control.

15. The computer program product of claim 11 wherein the actions further comprise:
configuring a plurality of display preferences, wherein each of the display preferences assigns a set of coordinate values that include the x coordinate value, the y coordinate value, and the z coordinate value to a different set of attributes selected from a plurality of attributes that correspond to the plurality of objects, wherein the first, second, and third attributes are included in the plurality of attributes.

* * * * *